United States Patent Office 3,198,733
Patented Aug. 3, 1965

3,198,733
PROCESS FOR THE CONTROL OF SULFATE-REDUCING BACTERIA
John Dominic Pera and John Miles Sharpley, Memphis, Tenn., assignors to Buckman Laboratories, Inc., Memphis, Tenn., a corporation of Tennessee
No Drawing. Filed Dec. 26, 1961, Ser. No. 162,273
4 Claims. (Cl. 252—8.55)

This invention relates to compositions for and to processes for the control of sulfate-reducing bacteria; exemplified by bacteria of the genus Desulfovibrio. More particularly, this invention relates to compositions containing a water-soluble salt of N,N-dimethyldithiocarbamate.

Sulfate-reducing bacteria are generally present in waters used for the secondary recovery of petroleum. The presence of these bacteria is objectionable if not controlled. For example, these organisms are able to reduce sulfates present in the injection water to sulfides which in turn react with soluble iron salts to form insoluble iron sulfide. As a result, matted deposits are produced consisting of sulfides, occluded oil, plus any other solids that may be present. This is undesirable because water containing such deposits when injected into subterranean formations causes the plugging thereof. Furthermore, sulfate-reducing bacteria cause corrosion of metal by accelerating galvanic action. Microbiological corrosion is well recognized and is a major economic problem in the petroleum industry. As such, it is the subject of numerous articles. J. M. Sharpley, in the book "Applied Petroleum Microbiology," 1961 (Library of Congress Catalogue No. 61–2850), and in an article in Corrosion, Vol. 17, No. 8, 386–390 (1961) has reviewed this literature. Reference is hereby made to those two reviews.

The microorganisms present in water which may be classified broadly as sulfate-reducing bacteria include many species of spore-forming and non-spore-forming bacteria, but in general sulfate reducing microorganisms belonging to the genus Desulfovibrio cause the most difficulty. Although several species of Desulfovibrio are found, such as *D. desulfuricans, D. aestuarii,* and *D. rubentschickii; D. desulfuricans* is the most common species isolated, both in frequency and objectionable properties. In addition, control of this particular species is difficult and for that reason it will be used in the following examples. We wish it understood that although the term "sulfate-reducing bacteria" conveys only a physiological and not a taxonomic meaning, it is used herein to include all bacteria and bacteria-like organisms which are characterized by their ability to reduce sulfates to sulfides. Such organisms will be recognized by qualified bacteriologists as belonging to several taxonomic genera but most often as belonging to the well known and characterized genus Desulfovibrio. For that reason this invention is applicable directly to all sulfate-reducing bacteria.

Heretofore, it has been particularly difficult to control the growth of sulfate-reducing bacteria by means of bactericides. In this regard, reference is hereby made to the paper by G. J. Guynes and E. O. Bennett, entitled "The Sensitivity of Sulfate-Reducing Bacteria to Anti-Bacterial Agents," published in Producers Monthly November 1958. These authors studied the effects of 28 organomercurial compounds and 63 phenolic compounds on such bacteria. Of the organomercurial compounds, none inhibited the growth of sulfate-reducing bacteria at concentrations as low as 50 p.p.m. This is true despite the fact that organomercurial compounds are generally the most effective and versatile bacteriostatic compounds known. In many cases, these compounds will inhibit the growth of bacteria other than sulfate-reducing bacteria at a concentration of less than 1 p.p.m. Of the phenolic compounds studied, also known for their general effectiveness, only three reduced the growth of sulfate-reducing bacteria at concentrations as low as 25 p.p.m.

Although chlorine and hypochlorite are effective bactericides, the use of these compounds to control sulfate-reducing bacteria in the petroleum industry is limited. This is true because the available chlorine tends to react with suspended materials present in these waters. Thus unless a rather large quantity of chlorine or the hypochlorite is used, no available chlorine will be present to act as a bactericide. If a sufficient quantity of either is used to provide an excess over that required for reacting with the suspended materials, the excess of chlorine or hypochlorite used will itself cause corrosion.

It is, therefore, a principal object of the present invention to provide a composition for use in controlling the growth of sulfate-reducing bacteria that obviates the disadvantages of the prior art compositions of this character.

It is another object of this invention to provide a composition for the control of sulfate-reducing bacteria in waters used for the secondary recovery of petroleum which has a high degree of effectiveness at low concentrations.

It is another object of our invention to provide a composition that is compatible with bactericides used for the control of slime-forming microorganisms.

These and other objects and advantages of the invention will appear as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises compositions and processes for controlling sulfate-reducing bacteria utilizing aqueous solutions of water-soluble salts of N,N-dimethyldithiocarbamic acid, which solutions are added to the aqueous medium containing the sulfate-reducing bacteria.

In another aspect of the invention, aqueous solutions of water-soluble salts of N,N-dimethyldithiocarbamic acid plus a bactericide capable of controlling slime-forming microorganisms are added to the water used for the secondary recovery of petroleum. In the latter example, the compositions will control the growth and proliferation of sulfate-reducing bacteria as well as slime-forming microoragnisms.

Although alkali metal and alkaline earth metal N-monoalkyl- and N,N-dialkyldithiocarbamates are known compounds and possess various utilities as bactericides, fungicides and nematocides, we were surprised to discover that the dimethyldithiocarbamates possess a high and relatively unique activity against Desulfovibrio, whereas the corresponding monoalkyldithiocarbamates possess neither the high order of activity nor the specificity against such sulfate-reducing bacteria, even though they are found much more active against iron bacteria as reported in U.S. Patent 2,929,758 than is the dimethyldithiocarbamate.

We have found that the growth and proliferation of sulfate-reducing bacteria can be inhibited by the addition of a water-soluble N,N-dimethyldithiocarbamate, specifically an alkali metal salt thereof to the aqueous medium containing the sulfate-reducing bacteria. The quantities required for this purpose are very small being within the range of 0.5 and 20 p.p.m. of the water. The maximum quantity required, however, rarely exceeds 10 p.p.m. As indicated in the following examples, the corresponding alkali metal salt of N-methyldithiocarbamic acid which has a high order of activity against iron bacteria is much less active than the N,N-dimethyldithiocarbamate in controlling the growth of sulfate-reducing bacteria.

We have also discovered that the water-soluble N,N-dimethyldithiocarbamates of this invention may be used in combination with other toxicants and slime-control agents. Specific examples include water-soluble salts of cyanodithioimidocarbonic acid which possess a high order of activity against species of Aerobacter and Pseudomonas (non-sulfate-reducing bacteria) and which many times are associated with deposits formed in secondary-recovery petroleum operations. When used in combination, either when added separately or together to the same process water, the activity of the cyanodithioimidocarbonates toward species of non-sulfate-reducing bacteria is not usually decreased. On the other hand, the activity of the N,N-dimethyldithiocarbamate is not substantially decreased against the sulfate-reducing bacteria by the presence of the cyanodithioimidocarbonate. It will thus be seen that both the sulfate-reducing and the non-sulfate-reducing bacteria can be controlled in the secondary recovery of petroleum operations by the use of a combination of two or more such toxicants. This combination of toxicants can conveniently and advantageously be dispensed in the form of concentrated aqueous solutions containing the two or more active constituents. Water-soluble salts of N,N-dimethyldithiocarbamic acid are compatible with water-soluble cyanodithioimidocarbonates and consequently stable concentrated aqueous solutions of the two, may be prepared for such use. Water-soluble salts of N,N-dimethyldithiocarbamic acid are also compatible with water-soluble salts of N-monomethyldithiocarbamic acid, ortho-phenylphenol, 2,4,6-trichlorophenol, and other polychlorophenols. It, therefore, follows that concentrated aqueous solutions containing any of these combinations may be prepared and dispensed in that form.

Combinations of toxicants with water-soluble N,N-dimethyldithiocarbamates, which are not compatible in concentrated aqueous solutions, may be dispensed in solid particulate form, or in the form of suspensions in water or other liquids, or may be added individually to the process waters, either as solutions or solids. If desired, the process waters may be preliminary treated with the N,N-dimethyldithiocarbamate, to suppress sulfate-reducing bacteria, and thereafter the cyanodithioimidocarbonate or other toxicant for control of other slime-forming microorganisms may be added to the pretreated waters. Examples of toxicants which may be used in such combinations with water-soluble N,N-dimethyldithiocarbamates are organomercuric compounds, organotin compounds, and inorganic copper compounds, as well as copper salts of organic compounds.

An especially effective composition for use in accordance with our invention is an aqueous solution containing a mixture of potassium N,N-dimethyldithiocarbamate, sodium cyanodithioimidocarbonate, and ethylenediamine in the proportions of about 35, 12, and 5 percent by weight respectively. This is essentially a composition containing an alkylene diamine and an alkali metal cyanodithioimidocarbonate in the proportions disclosed and claimed in U.S. 2,881,070, and in addition thereto an alkali metal N,N-dimethyldithiocarbamate. For general use, these compositions will contain between 5 and 50 percent by weight of each of the cyanodithioimidocarbonate and the N,N-dimethyldithiocarbamate.

Potassium N,N-dimethyldithiocarbamate is conveniently prepared by the recognized method which comprises adding carbon disulfide to a mixture of dimethylamine and potassium hydroxide, each in an equimolar proportion, in an aqueous medium, according to the following equation:

$$KOH + CS_2 + (CH_3)_2NH \longrightarrow (CH_3)_2N-\underset{\underset{S}{\|}}{C}-S-K + H_2O$$

It is not necessary to isolate the resulting compound, which is obtained in substantially stoichiometric yield, since the solution may be used directly as such or mixed with solutions of other toxicants with which it is compatible, as described herein.

In order to disclose the nature of the present invention still more clearly, the following illustrative examples will be given. It is to be understood that the invention is not to be limited to the specific conditions or details set forth in these examples except insofar as such limitations are specified in the appended claims.

*Example 1*

The effect of potassium N,N-dimethyldithiocarbamate and various related compounds on the growth of the sulfate-reducing bacterium *Desulfovibrio desulfuricans*, was determined in this example.

The culture of *D. desulfuricans* used was isolated from a sample of secondary recovery injection water. The medium used was as follows:

| Ingredient: | Percent by weight |
|---|---|
| Sodium lactate, 60 percent | 0.532 |
| Yeast extract | 0.1 |
| Ascorbic acid | 0.01 |
| Magnesium sulfate, hydrated | 0.02 |
| Dipotassium phosphate, anhydrous | 0.001 |
| Ferrous ammonium sulfate | 0.01 |
| Sodium chloride | 1.0 |
| Distilled water, q.v. to 100 ml. | |

The foregoing medium is described in the American Petroleum Institute RP 36, "Recommended Practice for Biological Analysis of Water-Flood Injection Waters," First Edition, May 1959. The medium was sterilized by autoclaving and the pH was adjusted to 7.5 with sodium hydroxide.

The culture medium above is designed to grow Desulfovibrio selectively from the group of bacteria that reduces sulfates but it is undoubtedly true that other species of anaerobic sulfate-reducing bacteria, such as Clostridium, are present in mixed cultures from injection waters. It should be understood that such mixed cultures are recognized by skilled bacteriologists as being more difficult to control with bactericides than pure cultures of Desulfovibrio. Furthermore, such cultures provide a more practical testing environment. The inoculum used for testing was from the third successive 24 hour transfer of an actively growing culture of sulfate-reducing bacteria. In this context, an actively growing culture is defined as a liquid culture which turns black within 24 hours after inoculation. Ten milliliters of inoculum was added to each liter of medium.

From stock solutions of the chemicals to be tested, sufficient amounts of the compounds were added to 2 oz. clear glass bottles so that when a bottle was completely filled, the desired concentration of chemicals was present. The amounts of stock solution added did not exceed 10 percent of the total volume of the test bottles. After the addition of the various concentrations of toxicants to the bottles, they were completely filled with inoculated liquid medium in such a manner as to exclude all air and provide an anaerobic state. The bottles were then capped with plastic caps containing Teflon liners and incubated at 35° C. ±2° C.

All work was done in duplicate with at least three controls for each series. The controls consisted of bottles filled with inoculated medium only. Growth of sulfate-reducing bacteria was indicated by an intense blackening of the medium, whereas, containers having sufficient chemical present to inhibit growth remained clear. Bottles with no growth of sulfate-reducers were observed for 30 days after the controls had blackened. From these data, the point of bacteriostasis was determined from the lowest concentration of chemical inhibiting the reduction of sulfate to sulfide.

The compounds which were included in this test in this example and the lowest concentration of the chemical inhibiting the growth of the sulfate-reducing bacteria are included in the following table.

| Compound | Minimum concentration which inhibited growth of sulfate-reducing bacteria parts per million |
| --- | --- |
| Potassium N,N-dimethyldithiocarbamate | 3. |
| Potassium N,N-diethyldithiocarbamate | 23. |
| Potassium N,N-dipropyldithiocarbamate | 45. |
| Potassium N,N-diisopropyldithiocarbamate | Greater than 100. |
| Potassium N,N-dibutyldithiocarbamate | Greater than 100. |
| Potassium N-methyldithiocarbamate | 100. |

The foregoing results demonstrate that of the various N,N-dialkyldithiocarbamates, N,N-dimethyldithiocarbamate of the series has a uniquely high effectiveness in controlling the growth of sulfate-reducing bacteria. This unexpected result is contrary to the usual effect noted with other microorganisms where the difference between the dimethyl- and diethyldithiocarbamates is usually slight. In addition, dipropyl- and diisoproplydithiocarbamates are effective in many instances against other microorganisms.

*Example 2*

Similar tests were made utilizing potassium N,N-dimethyldithiocarbamate in combination with sodium cyanodithioimidocarbonate. These tests showed that the components may be used in combination without any substantial adverse influence on the activity of the components against sulfate-reducing bacteria.

Suitable and preferred mole ratios of the potassium N,N-dimethyldithiocarbamate varied from 1 to 5 and 2 to 4 moles per mole of the sodium cyanodithioimidocarbonate, respectively.

*Example 3*

Similar tests were made utilizing potassium N,N-dimethyldithiocarbamate in combination with sodium cyanodithioimidocarbonate and ethylenediamine. These tests showed that the components may be used in combination without any substantial adverse influence on the activity against sulfate-reducing bacteria.

Mole ratios which were found suitable varied from 1 to 5 moles of the potassium N,N-dimethyldithiocarbamate, 0.5 to 2 moles of the ethylenediamine to each mole of the sodium cyanodithioimidocarbonate. Preferred mole ratios varied from 2 to 4 moles of the potassium N,N-dimethyldithiocarbamate and 1.0 to 1.5 moles of ethylenediamine per each mole of the sodium cyanodithioimidocarbonate.

The procedures of Examples 2 and 3 were repeated in which other alkali and alkaline earth metal salts of N,N-dimethyldithiocarbamic and of cyanodithioimidocarbonic acids were substituted for the potassium and sodium salts used in those examples. Similar results were obtained.

*Example 4*

In this experiment the effect of a composition containing the three components in a mole ratio of about three moles of potassium N,N-dimethyldithiocarbamate, about 1.5 moles of sodium cyanodithioimidocarbonate, and about 2 moles of ethylenediamine was determined on aerobic bacteria flora from oil field secondary recovery waters. The inoculum contained species of Pseudomonas, Bacillus, and Aerobacter, which are aerobic, spore-forming and non-spore-forming organisms. Other unidentified species of microorganisms were present. A standard nutrient agar substrate of the following composition was used:

| Ingredient: | Grams per liter of distilled water |
| --- | --- |
| Polypeptone | 5.0 |
| Beef extract | 3.0 |
| Sodium chloride | 8.0 |
| Agar | 15.0 |

After sterilization by autoclaving, sufficient of this nutrient substrate was added to 1.0 percent of the mixed bacterial inoculum and the diluted toxicant to total 50 ml. Duplicate petri dishes were then prepared to determine the inhibiting effect of the toxicant material when added to this nutrient agar. The results were as follows:

20 p.p.m. of this composition (35 percent solution) gave greater than 99 percent inhibition of the total bacterial flora.

In another series of tests, 6 p.p.m. of this same composition (35 percent solution) inhibited greater than 99.8 percent of the total bacterial flora. In this test, the agar substrate used was one prepared by adding 15 grams of agar to 1 liter of the broth described in Example 1.

In both series, compositions containing potassium N-methyldithiocarbamate or a chlorinated phenol failed to inhibit the growth of the microorganisms at even higher concentrations.

When the compositions disclosed in the present invention are used for control of sulfate-reducing bacteria and other slime-forming microorganisms in secondary recovery petroleum operations, they may be added continuously to the injection water to provide a concentration between 0.5 and 20 p.p.m. of the water-soluble salt of the N,N-dimethyldithiocarbamic acid. We wish to point out again that as a general rule it is rarely necessary to provide a concentration of the N,N-dimethyldithiocarbamate in the injection water exceeding 10 p.p.m.

The N,N-dimethyldithiocarbamate and mixtures of this compound as referred to hereinbefore are advantageously added in secondary recovery water systems at the producing well, sump pits, source wells, or ahead of the filter, in order that the microorganisms downstream of these sites may be satisfactorily controlled.

The terms alkali metal and alkaline earth metal have been used herein in accordance with their generally accepted meaning and include sodium, potassium, calcium, and barium, as well as the other less common metals of these groups.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. In the production of petroleum in a secondary recovery petroleum operation, the method of inhibiting deterioration of the crude oil-water mixture by the growth of sulfate-reducing bacteria in the water by adding to the aqueous fluid 0.5 to 20 parts per million parts of water of a water-soluble N,N-dimethyldithiocarbamate.

2. A process for the control of the growth and proliferation of sulfate-reducing bacteria in secondary recovery petroleum operations which comprises adding to the water in such systems a water-soluble N,N-dimethyldithiocarbamate in an amount to provide a concentration of the N,N-dimethyldithiocarbamate of between 0.5 and 20 parts per million parts of water.

3. A process for the control of the growth and proliferation of sulfate-reducing bacteria as well as species of slime-forming microorganisms in secondary recovery petroleum operations which comprises adding to the water in such systems a mixture comprising a water-soluble N,N-dimethyldithiocarbamate and a water-soluble cyanodithioimidocarbonate in a molar ratio of 1 to 5 moles of the former per mole of the latter and in an amount to provide a concentration of the N,N-dimethyldithiocarbamate of between 0.5 and 20 parts per million parts of water.

4. A process for the control of the growth and proliferation of sulfate-reducing bacteria as well as species of slime-forming microorganisms in secondary recovery petroleum operations which comprises adding to the water in such systems a mixture comprising a water-soluble N,N-dimethyldithiocarbamate, ethylenediamine, and a water-soluble cyanoidithioimidocarbonate in a molar ratio of 1 to 5 moles, 1 to 2 moles, and 1 mole, respectively, of the three components and in an amount to provide a concentration of the N,N-dimethyldithiocarbamate of between 0.5 and 20 parts per million parts of the water.

References Cited by the Examiner

UNITED STATES PATENTS

| | | | |
|---|---|---|---|
| 1,972,961 | 9/34 | Tisdale et al. | 167—22 |
| 2,692,231 | 10/54 | Stayner et al. | 252—8 |
| 2,867,279 | 1/59 | Cocks | 252—8 |
| 2,881,070 | 4/59 | Pera | 162—161 |
| 2,881,071 | 4/59 | Buckman et al. | 162—161 |
| 2,929,758 | 3/60 | Buckman et al. | 162—161 |
| 3,024,159 | 3/62 | Bollenback et al. | 252—8 |

FOREIGN PATENTS

| | | |
|---|---|---|
| 1,192,252 | 10/59 | France. |
| 861,867 | 3/61 | Great Britain. |

JULIUS GREENWALD, *Primary Examiner.*